T. F. ROBINSON.
SAFETY DEVICE FOR MOTOR VEHICLES.
APPLICATION FILED SEPT. 23, 1920.
1,407,579.
Patented Feb. 21, 1922.
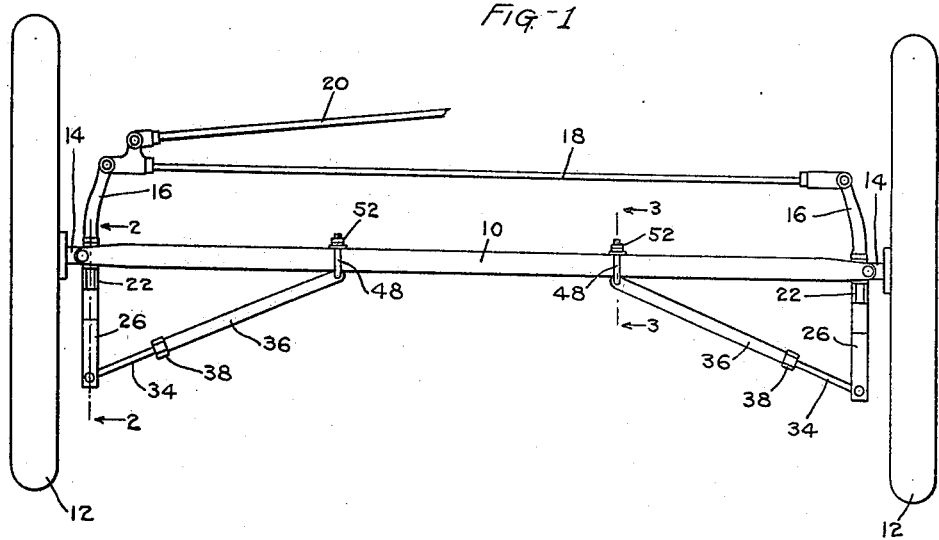
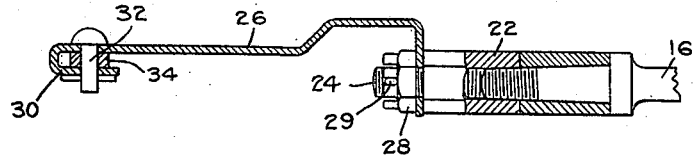
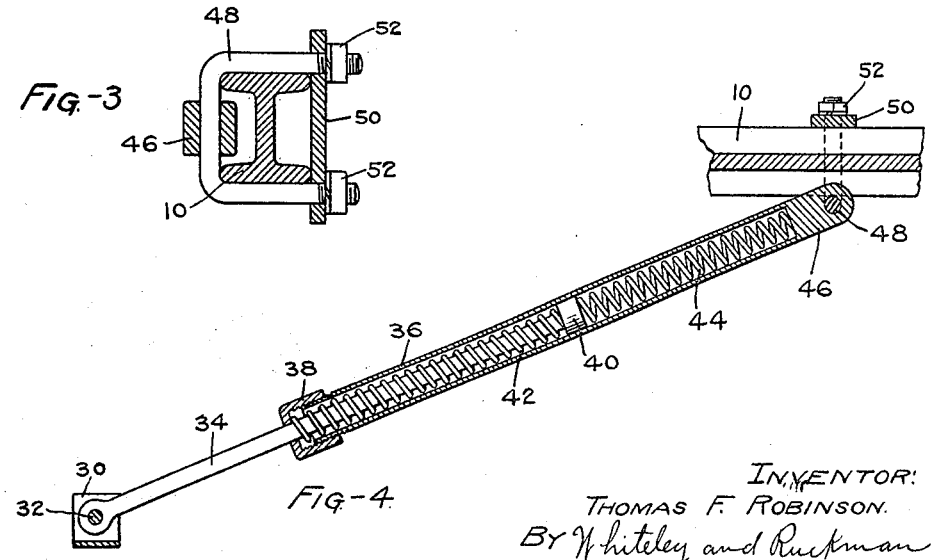
INVENTOR:
THOMAS F. ROBINSON.
By Whiteley and Ruckman
ATTORNEYS.

UNITED STATES PATENT OFFICE.

THOMAS F. ROBINSON, OF MINNEAPOLIS, MINNESOTA.

SAFETY DEVICE FOR MOTOR VEHICLES.

1,407,579.  Specification of Letters Patent.  Patented Feb. 21, 1922.

Application filed September 23, 1920. Serial No. 412,335.

*To all whom it may concern:*

Be it known that I, THOMAS F. ROBINSON, a citizen of the United States, residing at Minneapolis, in the county of Hennepin and State of Minnesota, have invented certain new and useful Improvements in Safety Devices for Motor Vehicles, of which the following is a specification.

My invention relates to safety devices for motor vehicles, and an object is to provide an attachment for use in connection with the steering mechanism for resiliently retaining the front wheels in normal position to insure travel of the vehicle in a straight forward direction when the steering mechanism is not operated to turn the vehicle toward one side or the other. Another object is the provision of a device of this character which can be quickly and easily applied to motor vehicles of different makes without changing their construction.

The full objects and advantages of my invention will appear in connection with the detailed description thereof, and the novel features embodied in my inventive idea will be particularly pointed out in the claims.

In the accompanying drawings which illustrate the application of my invention in one form,—

Fig. 1 is a plan view showing the front axle and a portion of the steering mechanism of a motor vehicle with my safety device attached thereto; Fig. 2 is an enlarged view mostly in section on the line 2—2 of Fig. 1; Fig. 3 is a view in section on the line 3—3 of Fig. 1; Fig. 4 is a sectional view showing the device attached to the front axle, the latter being in horizontal section.

Referring to the particular construction shown in the drawings, my safety device is shown applied to a motor vehicle having a front axle 10 in the form of an I-beam which is mounted upon front wheels 12 rotatably mounted on spindles 14 to which are attached knuckle arms 16 connected by a tie-rod 18 to which is secured a steering gear connecting rod 20. The front end of each knuckle arm 16 is threaded and receives an internally threaded sleeve 22 within the outer end of which is secured a threaded bolt 24. One of the safety devices is attached to each knuckle arm 16, as shown in Fig. 1, and since the pair of safety devices are exactly alike, the following detailed description of one of them will be sufficient.

A link 26 is offset towards one of its ends, as shown in Fig. 2, and then bent at right angles and provided with a hole or passage for the bolt 24, this end of the link being secured by a nut 28 and a cotterpin 29. The other end of the link is turned backwardly to form the parallel portion 30 and a bolt 32 is passed through a hole in the portion 30 and a registering hole in the main portion of the link, this bolt also passing through a hole in the outer end of a plunger rod 34. This end of the plunger rod lies between portion 30 and the main portion of the link. The rod 34 extends at an angle from the link 26 toward the axle and is mounted for reciprocating movement in a tube 36 having a removable cap 38 at its outer end through which the rod passes. The rod 34 has an enlarged end or head 40 normally positioned about midway in the tube 36, and a coiled spring 42 surrounds the rod between this head and the cap 38. A second coiled spring 44 is placed between the head 40 and the rear end 46 of the tube, this end being provided with a hole through which is passed a U-bolt 48, the arms of which (as best shown in Fig. 3) extend back in contact with the upper and lower surfaces of the axle 10, and are secured by means of a plate 50 and nuts 52 whereby the tube 36 is pivotally attached to the axle.

The operation and advantages of my invention will be readily understood from the foregoing description. The tubes and plunger rods are permitted to swing upon the U-bolts 48 and the links 26 when the steering mechanism is operated to swing the front wheels either to the right or left for steering purposes. When the wheels are swung in one direction, the spring 44 in one tube and the spring 42 in the other tube will be compressed, and when the wheels are swung in the other direction the compression of the springs occurs reversely. When the steering wheel is released, the action of the springs which are under compression automatically returns the front wheels to their normal position at right angles to the front axle. My safety device not only retains the front wheels in normal position so that sand, rough and muddy roads can be traveled safely but controls the car in case any part of the steering mechanism comes loose or breaks. The use of my device relieves strain on the arms of the driver which would otherwise occur from road-shock and jerking of the steering gear when running on rough and rutty roads, and the car holds its course as smoothly on a highly crowned road as it does on a flat one. The use of my device not only affords protection and safety in driving all makes of automobiles whether large or small but also enables the driver to handle a small car with the same ease and smoothness that attends the driving of a heavy car which is equipped with a worm and sector steering gear. Further, the use of my device prevents the steering arm from passing center and prevents a small car from jack-knifing.

I claim:

1. A safety device for use in connection with the front axle and steering knuckles of automobiles comprising, a tube of uniform diameter throughout its length, means for pivotally attaching the rear end of said tube to the front axle, a closure for the front end of said tube, a plunger rod of uniform diameter throughout its length extending through said closure and having the head adapted to reciprocate in said tube, a coiled spring between said head and the rear end of said tube, a coiled spring surrounding said plunger rod between said head and said closure, a link pivotally attached at its forward end to the outer end of said plunger rod, and means for attaching the rear end of said link to the steering knuckle.

2. A safety device for use in connection with the front axle and steering knuckles of automobiles comprising a tube of uniform diameter throughout its length, means for pivotally attaching the rear end of said tube to the front axle, a removable cap for the front end of said tube, a plunger rod extending through said removable cap and having a head adapted to reciprocate in said tube, a coiled spring surrounding said plunger rod between said head and said removable cap, a coiled spring between said head and the rear of said tube, a link pivotally attached at its forward end to the outer end of said plunger rod, an internally threaded sleeve adapted to be threaded part way upon the knuckle arm, a bolt adapted to be threaded into the outer end of said sleeve, the rear portion of said link being offset and bent to form a right angular end, and means for securing said right angular end to said bolt.

In testimony whereof I hereunto affix my signature.

THOMAS F. ROBINSON.